2 Sheets—Sheet 1.

N. THOMPSON, Jr.
Car Seat and Couch.

No. 22,462. Patented Dec. 28, 1858.

Inventor:
Nathan Thompson Jr

N. THOMPSON, Jr.
Car Seat and Couch.
No. 22,462.
2 Sheets—Sheet 2.
Patented Dec. 28, 1858.
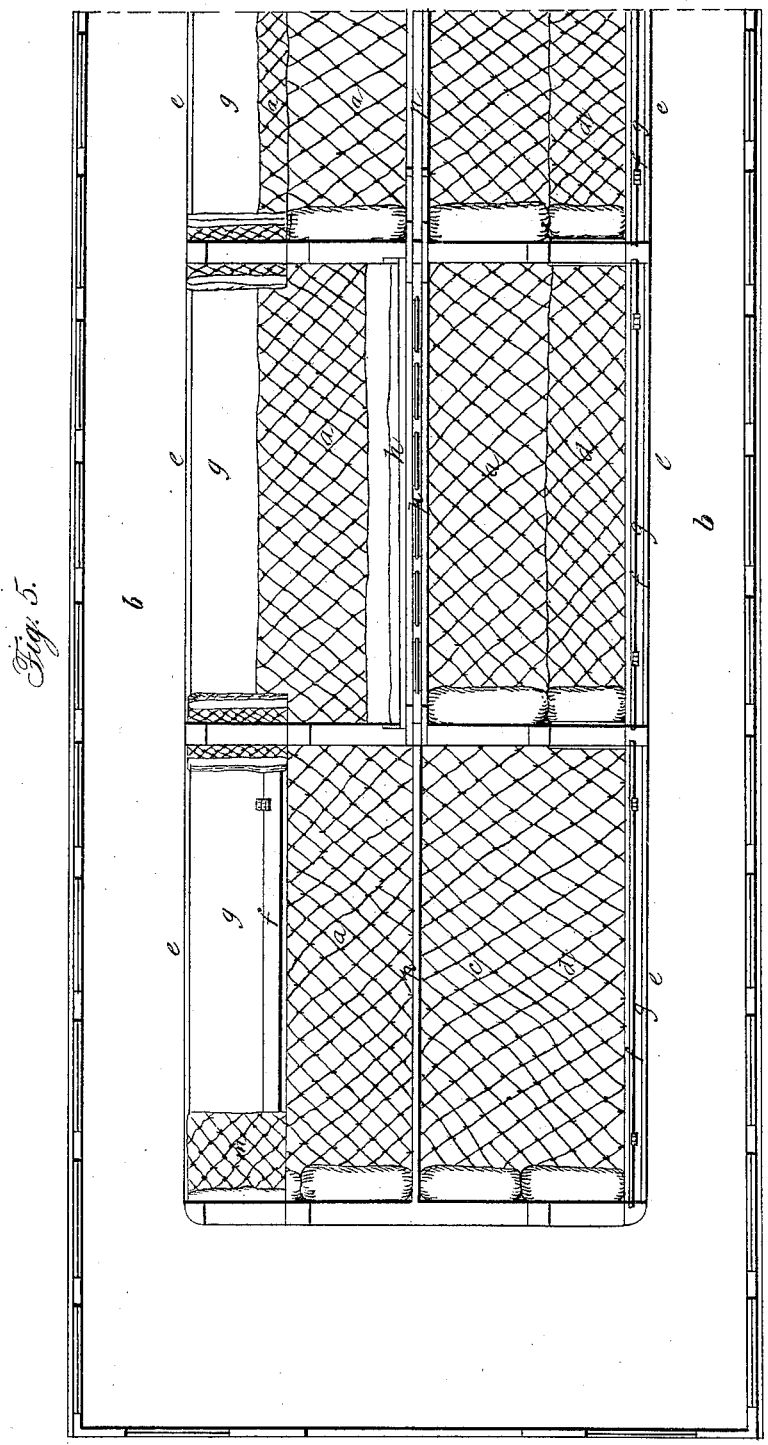
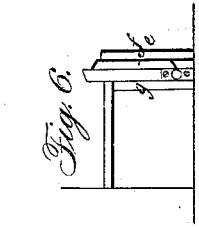
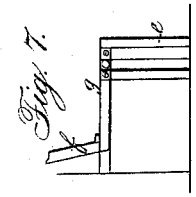
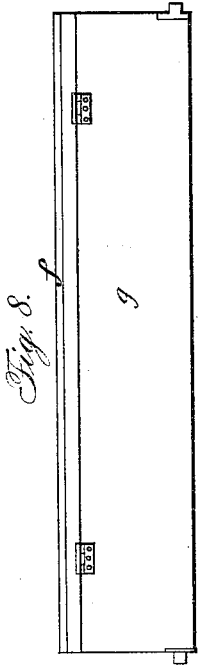
Inventor:
Nathan Thompson jr

UNITED STATES PATENT OFFICE.

NATHAN THOMPSON, JR., OF BROOKLYN, NEW YORK.

RAILROAD-CAR SEAT AND COUCH.

Specification of Letters Patent No. 22,462, dated December 28, 1858.

*To all whom it may concern:*

Be it known that I, NATHAN THOMPSON, Jr., of Brooklyn, western district, Kings county, New York, have invented certain new and useful Improvements in the Mode of Fitting Up Railroad-Cars so That They May Be Used Either for Sitting or Sleeping Cars, and that the following specification, taken in connection with the drawings, is a full, clear, and exact description thereof.

Figure 1:
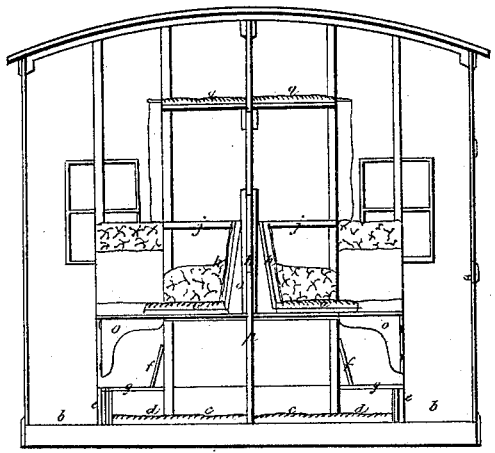
Figure 2:
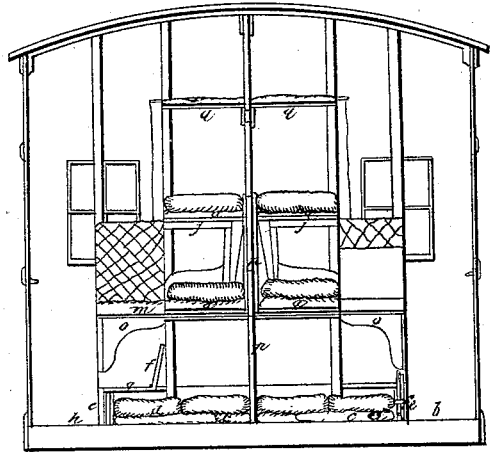
Figure 3:
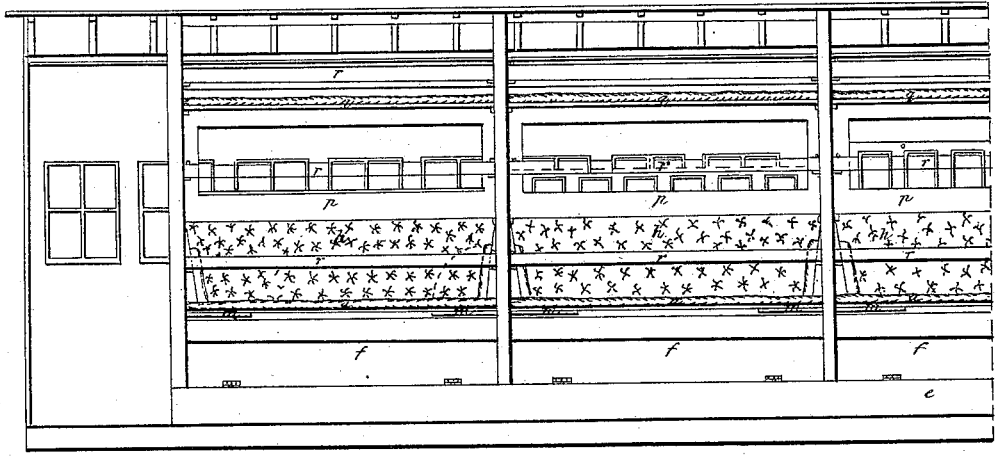
Figure 4:
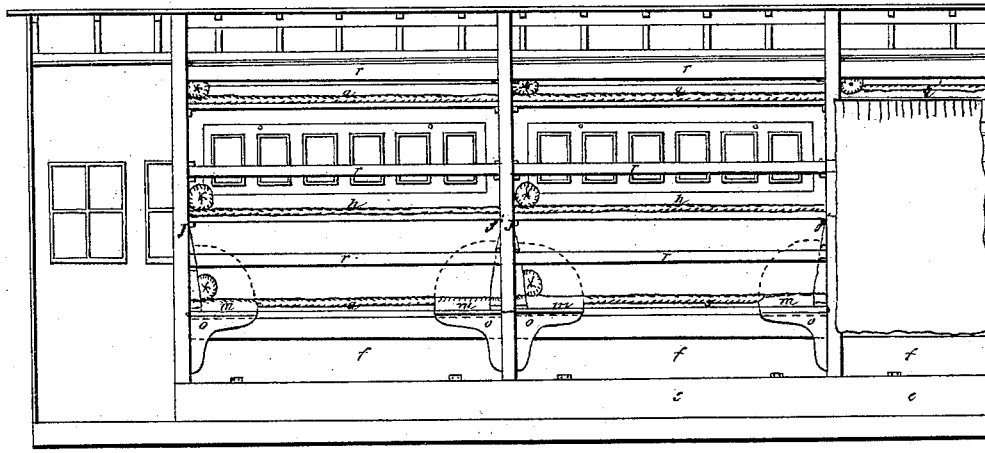

In the drawing Figure 1 is a cross section through a car fitted with my improvements in the position that they occupy when the car is in use as a sitting or day car. Fig. 2 is also a cross section exhibiting the same parts adjusted in such position that passengers may recline at length. Fig. 3 is a longitudinal elevation of the fittings occupying one side of a car adjusted as in Fig. 1. Fig. 4 is also a longitudinal elevation of the same adjusted as in Fig. 2. Fig. 6 is a plan or bird's-eye view of the seats and couches adjusted in various ways, and Figs. 6, 7, and 8, are distant views of an apron hereafter to be explained.

My mode of fitting cars is applicable both to long and short cars technically so termed but has been more especially devised with reference to the long or double truck car in common use in this country, and in making my invention I have had several objects in view, not ordinarily attained in what are commonly termed sleeping cars, the first being that the car shall carry as many or nearly as many passengers when sitting as the cars in common use now do; the second that it shall accommodate the same number when reclining at length; the third that the transformation from sleeping to sitting and vice versa shall be such that it may be effected *seriatim* so that any one or more passengers, counting by one at a time may take either position they may prefer without materially discommoding others; and in addition I have endeavored to accomplish objects that have been sought by others—namely that the passengers shall be safe in either position, that the change from one adjustment to the other shall be easy and one which requires little or no instruction for its performance and lastly that the fittings shall not be complex, costly, or easily liable to derangement.

With these objects in view, I have determined to seat the passengers sidewise or looking across the car a position recommended by many as the best on considerations that have no reference to a change into a sleeping car, and secondly I have been led to raise my seats so as to allow the floor of the car itself to be used as berths when covered with cushions, mattresses or rugs, and the nature of the first part of my invention consists in combining longitudinal seats, with a raised platform and with mattresses or cushions underneath both seats and platform substantially in the manner hereafter described, and the nature of second part of my invention consists in combining with seats platforms and couches underneath them both a back to the seats so contrived substantially as specified that it may be made at pleasure to serve the purpose of a couch or bed above the ordinary seat and the nature of the third part of my invention consists in making the top of the platform or the foot stand of the lower tier of seats, removable so as to admit of ready access to the tier of couches on the floor of the car substantially as specified, and my invention also consists in the arrangement within a rail road car of longitudinal couches upon the floor or nearly so with proper passage ways, to give access to them and other seats or couches also longitudinal above these couches with backs that can be converted into a third row of couches and acceptable through the same passage all as hereinafter set forth, and my invention further consists in combining with a longitudinal passage way, longitudinal car seats when these seats have backs substantially such as described capable of such change of position as to form a row of couches above these seats or when these seats are made as described capable of sliding transversely so as to accomplish the objects hereafter described and lastly my invention consists in combining with car seats having couches on the floor underneath them and backs capable of conversion into couches certain sliding or otherwise adjustable seats which may serve either as seats or as steps facilitating ascent into the couches above all substantially as described.

By reference to the drawings it will be perceived that the main seats of the car as at *a a a* are longitudinal and arranged back to back, with an alley or passageway such as *b b b* extending along each side of the car. These seats are high enough from the floor to leave space below them for the insertion of couches or cushions such as *c c c* laid upon the floor of the car, with sufficient room between the cushion and the bottom of the main seat to admit of a person lying down on the floor outside of the row of cushions each of which is wide enough for a single person is another row *d d d* also on the floor of the car and outside of the latter is a combing or riser such as *e e e* making a partition between these cushions and the passageway. Over this outer row of cushions extends an apron *f g* made by preference of two pieces the one *g* to cover the lower cushions, and serve as a foot board or stool for the passengers seated upon the main seats and the other *f* rising from this foot board and preventing dirt falling from the foot board upon the lower tier of cushions.

As represented in the drawings the piece *f* is hinged to *g* and may be folded back upon it, when both may be dropped into a recess in the combing or along side of it a proper pin and groove being used to control the motions of the apron. Now parts of this apron is in fact the top of a platform raised above the level of the car floor, and it may be made and fitted in various ways so long as it serves as a foot stool at times and affords when required free access to the berths below the main tier. The rising part of the apron may be of leather or other flexible material or may be dispensed with altogether.

The backs of the main seats *h h h* when used as backs are inclined and lie with their ends in a groove clearly shown in Figs. 1 and 2. The bottom of this groove is flush with the standing partitions between the various rows of seats or couches and above the main tier of seats are battens or cross bars such as *j j j* the grooves and battens being so constructed that the back can by lifting and turning be changed from the position shown in Fig. 1 to that which it is represented as occupying in Fig. 2. The main seat is also fitted to slide to a limited extent across the car from position as shown in Fig. 1 to that which is shown in Fig. 2 and by such sliding I attain a wide seat in fact (that is measuring from the lower part of the back to the front edge of the seat) when in use as a seat and can shove it back as in Fig. 2 when to be used as a bed, thus utilizing the space occupied by the slope of the back and also affording a freer access to the berths below.

Directly under the main tier of seats and at the end of each seat are located two small sliding seats *m m* which slide in ways attached to partitions or to the bars supporting the main seats and these seats may be supported when drawn out by brackets *o o o* or in any other convenient way, and these seats may also instead of sliding be hinged to the partition, dropping down when out of use, and lifted and supported by hooks or brackets when in use.

Along the middle of the car between the rows of main seats and the rows of floor berths runs a partition *p p* which I prefer to make double and with sliding shutters therein and under the roof of the car are arranged on each side of the longitudinal partition a row of couches *q q* which will be useful for children or for holding coats, baggage, shawls, etc. At times I intend to fasten hooks to the cross partition on which may be supported preventers *r r* much in the same way as the back of the middle seat of an old fashioned stage coach was supported and these preventers made of leather or strong webbing will when in place prevent passengers from being thrown out of the couches or seats or backs when arranged for sleeping. I sometimes intend to place the seats, platforms, etc., along the side of the car, all having the same relative arrangement as shown in the drawings but being located on each side of a central passage or alley way, but prefer the two alley ways and seats back to back as represented in the drawings.

The main tier of seats are intended in practice to be six feet in length between the transverse bulkheads. Their backs and the tier of cushions on the floor will consequently be of the same length, and when arranged as a sitting car with the sliding or small adjustable end seats shoved in and the top of the platform in position as shown in Fig. 7 each seat of the main tier will comfortably accommodate four persons and as there are two rows of this tier, the car will hold two persons in each eighteen inches of its length. The four persons who occupy this seat will rest their feet on the top of the platform, the seat being raised so high to admit of the tier of berths on the floor that some such foot stool becomes necessary—and when the passengers are thus seated the seat will be pulled out away from the back so as to make the seat in fact a wide one. If one of these four wishes to lie down he can raise the apron and get into the berth directly below the main seat and the apron can then be replaced as in Fig. 7, the three that are left still sitting on the main seat. When the second wishes to recline the back of the main seat is to be raised and turned and the two end sliding seats pulled out and the main seat shoved back against the partition. The second can then lie down on the seat itself or on the back, which then becomes the third berth counting from the bottom. The two that are left can then seat themselves on the small sliding seats. The third passenger can if he now desires lie down either on the back or the main seat whichever is unoccupied and the fourth finds his berth by placing the apron and platform top in position shown in Fig. 6 when he can recline along side of the passenger lying directly under the main seat, and is protected from contact of passers by the combing or riser.

The transverse bulkheads or partitions are carried out as wide as the platform up to the height of the top of the back of the main tier, and serve as backs to the small adjustable end seats.

Children or light persons can occupy the upper tier of all at all times and when so used more persons can lie in the car at full length than can be seated in it or in any car having seats arranged in any manner known to me.

Cushions for pillows can be stowed away under the main tier of seats and brought into use when needed and the preventers can be hooked in place when the passengers are in their berths.

Each separate compartment may if desired be provided with curtains that will screen all within when lying down such curtains being shown in the drawings and the conductor will always have a free passage way along the alley between the riser and the side of the car whether the passenger be sitting or lying down.

Now the precise mechanical devices by which the seats and backs and platform are made susceptible of motion for the purpose set forth are unimportant so long as the various parts can have the changes of position described for the purposes as specified and I contemplate many modifications of the precise devices shown and described.

I claim as of my own invention—

1. The combination of longitudinal seats, with a raised platform and berths or reclining places beneath the seats and platform substantially in the manner described.

2. In combination with berths or reclining places beneath a seat, and a raised platform serving as a foot stool to such seat, I claim a back to that seat capable of being moved or of change of place substantially as specified so that it may serve at will as a back or as a couch above the main seat.

3. I claim making the top of the platform or foot place pertaining to the main tier of seats movable substantially in the manner and for the purposes specified.

4. I claim arranging within a railroad car longitudinal couches along or upon the floor, and other couches or seats above these, with backs which may be converted into couches and passage ways or a passageway from which free access may be had to all the seats and couches the arrangement of the whole being substantially such as set forth.

5. I claim combining with longitudinal passage ways or a longitudinal passage way longitudinal seats when those seats have backs so constructed substantially as specified that they may be converted into couches or when those seats are free to slide transversely substantially in the manner described, the combination as a whole being as hereinbefore set forth.

6. I claim adjustable or movable end seats substantially such as described and serving if necessary as steps in combination with longitudinal car seats having backs capable of conversion into couches substantially in the manner specified.

In testimony whereof I have hereunto subscribed by name in the city of New York on the 14th day of August 1858.

NATHAN THOMPSON, Jr.

In presence of—
J. B. BULLOCK,
EDW. HUNT.